United States Patent [19]
Nugay et al.

[11] Patent Number: 5,744,558
[45] Date of Patent: Apr. 28, 1998

[54] 1,5-DIETHENYLNAPHTHALENE COMPOUNDS AND BIFUNCTIONAL PRIMERS FOR ANIONIC POLYMERIZATION PREPARED THEREFROM

[75] Inventors: Turgut Nugay, Cankaya-Ankara, Turkey; Gérard Riess, Mulhouse, France

[73] Assignee: Elf Atochem S.A., Puteaux, France

[21] Appl. No.: 843,338

[22] Filed: Apr. 15, 1997

Related U.S. Application Data

[62] Division of Ser. No. 409,989, Mar. 24, 1995, Pat. No. 5,674,799.

[30] Foreign Application Priority Data

Mar. 24, 1994 [FR] France ................................ 94 03487

[51] Int. Cl.$^6$ ........................... C08F 4/56; B01J 23/04
[52] U.S. Cl. .................... 526/175; 502/157; 526/173; 526/174; 526/319; 526/329.7; 526/335; 526/337; 526/340; 526/347; 526/347.1
[58] Field of Search ................................ 526/175, 174, 526/173; 502/157

[56] References Cited

U.S. PATENT DOCUMENTS

| | | |
|---|---|---|
| 4,450,259 | 5/1984 | Roggero et al. |
| 4,960,842 | 10/1990 | Lo et al. |
| 5,089,572 | 2/1992 | Marchand et al. |
| 5,462,994 | 10/1995 | Lo et al. |
| 5,464,914 | 11/1995 | Lo et al. |

OTHER PUBLICATIONS

Recueil Des Travaux Chimiques Des Pays–Bas, vol. 88, No. 9, Sep. 1969, Den Haag NI, pp. 1028–1040, H. Van Bekkum et al, "Synthesis of 1,4–, 1,5–, 2,6–and 2,7–Di–t–butylnaphthalene and of 1,4–, 1,5–, 2,6–and 1,8–Diisopropylnaphthalene", p. 1030.

Makromolekulare Chemie, Macromolecular Chemistry and Physics, vol. 185, No. 7, Jul. 1984, Basel Ch, pp. 1565–1582, T. Bastelberger et al., "New divinylidene compounds and their reaction with electron transfer reagents", p. 1581.

Synthesis, No. 5, May 1989, Stuttgart de, pp. 356–359, K. Blatter et al., "A convenient Synthesis of Some (1–Alkylethenyl)arenes and Bis(1–alkylethenyl)arenes", compose 6c.

*Primary Examiner*—Fred Zitomer
*Attorney, Agent, or Firm*—Burns, Doane, Swecker & Mathis, L.L.P.

[57] ABSTRACT

Bifunctional primer naphthalene compounds having the formula:

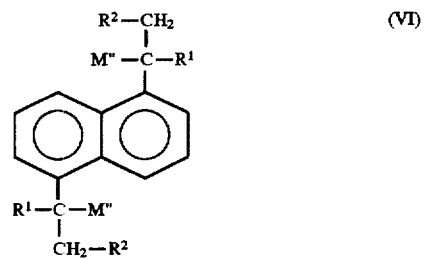

(VI)

wherein M" is an alkali metal, preferably sodium or lithium, and $R^1$ and $R^2$ are, e.g., alkyl radicals, are prepared from corresponding 1,5-diethenylnaphthalene derivatives, and are well suited for the improved anionic polymerization of diene, vinylaromatic and/or (meth)acrylic monomers.

5 Claims, No Drawings

1,5-DIETHENYLNAPHTHALENE COMPOUNDS AND BIFUNCTIONAL PRIMERS FOR ANIONIC POLYMERIZATION PREPARED THEREFROM

This application is a divisional of application Ser. No. 08/409,989, filed Mar. 24, 1995, now U.S. Pat. No. 5,674,799.

BACKGROUND OF THE INVENTION

1. Field of the Invention:

The present invention relates to novel 1,5-diethenylnaphthalene compounds, to a process for the preparation thereof, and to the conversion of same via reaction with an organic alkali metal compound into bifunctional primers for anionic polymerization mechanisms.

2. Description of the Prior Art:

Organic alkali metal compounds, such as organodilithium compounds, are known to this art as especially advantageous bifunctional primers for anionic polymerization reactions, since the three-step procedure required to prepare ABA sequenced copolymers by monofunctional priming is reduced by one step through the use of bifunctional primers. These latter are also important in copolymerization reactions, when the second monomer cannot re-initiate polymerization of the first.

Numerous sequenced copolymers have been prepared using alkali metal naphthalides as bifunctional primers. These bifunctional primers are efficacious only in polar reaction media, such a tetrahydrofuran, in particular for the polymerization of diene monomers. However, they cannot provide a polydiene microstructure having a high degree of 1,4-configuration (Cis- or trans-).

In the event that a special microstructure, in general a 1,4-cis addition for polydienes, is desired, the anionic polymerization must be carried out in a nonpolar solvent utilizing the alkali metal, e.g., lithium, as the counter-ion. Unfortunately, and probably because of associated reagents, organic alkali metal compounds, such as organodilithium compounds, exhibit a low level of solubility in hydrocarbonaceous solvents. Tests for increased solubility using very small amounts of ether or amines indicated that these additives affect the microstructure of the diene block. The disadvantage presented by the seeding technique is a high dispersion index for the central sequence.

To date, many compounds have been described for their possible use as bifunctional lithium-containing primers which are soluble in nonpolar solvents.

For example, U.S. Pat. No. 4,200,718, at column 14, describes the compound corresponding to the formula:

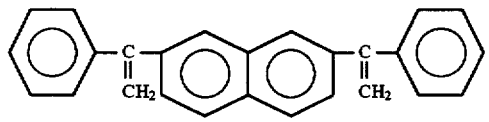

which is reacted with secondary butyllithium to prepare [2,7-naphthalenediylbis(3-methyl-1-phenylpentylidene]bis (lithium), a primer used for the anionic polymerization of butadiene.

Turgut Nugay and Savas Kucukyavuz, in *Polym. International*, 29, 195 (1992), describe the preparation of 1,5-diethenylnaphthalene and reaction thereof with secondary butyllithium in n-heptane, in the absence of any polar additive, thereby producing 1,5-bis(1-lithio-3-methylpentyl) naphthalene. This compound was easily isolated and the soluble monofunctional compounds removed. When dissolved in benzene (solubility: $3.2 \times 10^{-2}$ mole/liter), it was used a primer for the sequenced copolymeriztion of isoprene and styrene.

Nonetheless, need continues to exist to provide even better solubility in nonpolar solvents and enhanced control over the bifunctionality of such 1,5-bisubstituted naphthalene-containing primers.

SUMMARY OF THE INVENTION

Accordingly, a major object of the present invention is the provision of novel 1,5-diethenylnaphthalene compounds that avoid or conspicuously ameliorate the above disadvantages and drawbacks to date characterizing the state of this art.

Briefly, the present invention features compounds having the formula (I):

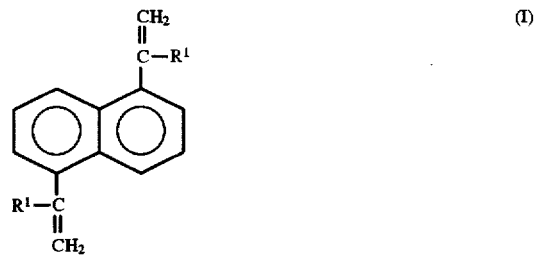

in which $R^1$ is a linear, branched, or cyclic alkyl radical having from 1 to 12 carbon atoms, or a substituted or unsubstituted aryl radical.

The alkyl radicals $R^1$ are preferably methyl radicals; the aryl radicals $R^1$ are preferably phenyl radicals.

The present invention also features a process for preparing the compounds (1), comprising, in a first step, reacting a compound having the formula (II):

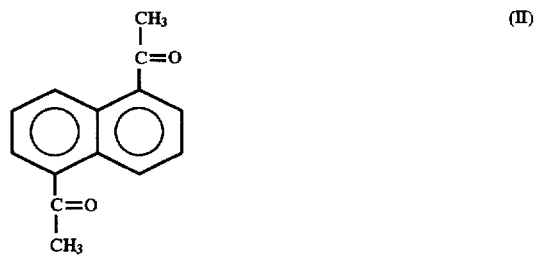

with a compound having the formula (III):

in which $R^1$ is as defined above; and M is an alkali metal or M'Hal (M' representing an alkaline earth metal, and Hal, a halogen), thereafter hydrolyzing the derivative thus formed to provide a compound having the formula (IV):

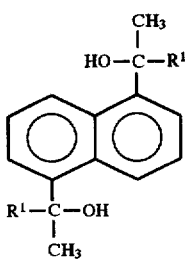
(IV)

and, in a second step, dehydrating the compound having formula (IV), thereby providing the desired final product.

DETAILED DESCRIPTION OF BEST MODE AND PREFERRED EMBODIMENTS OF THE INVENTION

More particularly according to the present invention, in the first step of the process aspect thereof, to add the organometallic compound (III) to the compound (II), the respective reagents are employed in amounts of at least two moles of compound (III) per 1 mole of compound (II), preferably using an amount of compound (III) slightly in excess of the stoichiometric amount, such addition being carried out in an aprotic solvent medium (e.g., tetrahydrofuran, toluene, ethyl ether, benzene, ethylbenzene, cyclohexane, and mixtures thereof), the temperature being regulated depending on the reagents used, and the reaction time being approximately 6 to 24 hours. This reaction is followed by hydrolysis carried out under conditions resulting in the deactivation of the reaction product, whether by means of methanol acidified with acetic acid or via the use of a water/ice/hydrochloric acid mixture.

The second step entailing dehydration can be carried out, for example, in an acetic acid/sulfuric acid medium concentrated under reflux, the proportion of sulfuric acid in comparison with the acetic acid being 0.1% to 5% by weight; or in a toluene/paratoluene sulfonic acid medium.

The present invention also features a bifunctional primer, namely, of the product of the reaction of the compound of formula (I), as indicated above, with a compound having the formula (V):

$$R^2\text{—}M''\qquad\qquad (V)$$

in which M" is an alkali metal, notably lithium or sodium; and $R^2$ is a $C_1$-$C_6$ alkyl radical, a $C_5$-$C_{12}$ cycloalkyl radical or an aromatic radical, with the proviso that the compound (V) can be an anionic polymer comprising a terminal carbanion $R^2$ and the counter-ion M", said bifunctional primer being represented by the following formula (IV):

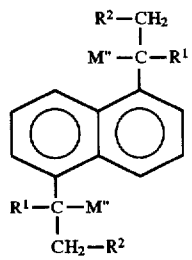
(VI)

in which $R^2$ preferably is a secondary butyl group.

When M" represents Li and when the organolithium compound (V) is an artionic polymer, thus affording a bifunctional primer providing star-shaped polymers, the polymeric carbanion $R^2$ may be a vinylaromatic polymer carbanion, such as polystyrene and poly(alpha-methylstyrene), or a diene-containing polymer carbanion such as polybutadiene and polyisoprene.

The bifunctional primer is synthesized by reacting compounds (I) and (V) in amounts of at least 2 moles of compound (V) per 1 mole of compound (I), in particular utilizing a slight excess of compound (V) as compared with the stoichiometric amount in a purified aprotic solvent medium (examples of solvents are provided above with reference to the addition of the organometallic compound (III) to compound (II)), with the subsequent polymerization being carried out by the direct addition of monomers to the reaction medium. A slight excess of compound (V) gives rise to deactivation of the residual protic impurities in the reaction medium.

Too, the present invention features a process for anionic polymerization of at least one polymerizable monomer with an alkali metal compound employed as the primer, this process being characterized in that the primer used is a bifunctional primer, as indicated above.

By "polymerizable monomers" are intended diene-containing, vinylaromatic, and (meth)acrylic monomers.

By the expression "diene-containing monomer" is intended a diene selected from among conjugated linear or cyclic dienes having from 1 to 20 atoms of carbon. Exemplary thereof are butadiene, isoprene, 1,3-pentadiene, cyclopentadiene, and 6,7,8,9-tetrahydroindene. The preferred monomers are butadiene and isoprene.

By the term "vinylaromatic" monomers are intended ethylenically-unsaturated aromatic monomers. Exemplary thereof are styrene, vinyltoluene, alphamethylstyrene, 4-methylstyrene, 3-methylstyrene, 4-ethylstyrene, 3,4-dimethylstyrene, 3-tertbutylstyrene, and 2-vinylnaphthalene. Hydroxylated styrene derivatives can also be employed, such as 4-methoxystyrene, 2-hydroxymethylstyrene, and 4-ethoxystyrene, provided that the OH function is protected. The preferred monomer is styrene.

By the term "(meth)acrylic monomer" is intended a monomer selected from among the (meth)acrylates having the following respective formulae:

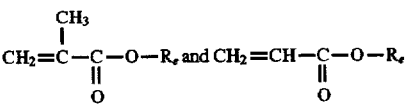

in which $R_e$ is a linear or branched, primary, secondary, or tertiary $C_1$-$C_{18}$ alkyl radical, a $C_5$-$C_{18}$ cycloalkyl radical, a ($C_1$-$C_{18}$ alkoxy) $C_1$-$C_{18}$ alkyl radical, a ($C_1$-$C_{18}$ alkylthium) $C_1$-$C_{18}$ alkyl radical, and aryl and aralkyl radicals, these radicals optionally being substituted by at least one atom of halogen and/or at least one hydroxyl group after protecting this hydroxyl group, said alkyl groups being linear or branched, glycidyl, norbornyl, isonorbornyl (meth) acrylates, and di-($C_1$-$C_{18}$ alkyl)-(meth)acrylamides.

Exemplary methacrylates having the above formula include methyl, ethyl, 2,2,2-trifluoroethyl, n-propyl, isopropyl, n-butyl, secondary butyl, tertiary butyl, n-amyl, 1-amyl, n-hexyl, 2-ethylhexyl, cyclohexyl, octyl, 1-octyl, nonyl, decyl, lauryl, stearyl, phenyl, and benzyl methacrylates. The preferred methacrylic monomer is methyl methacrylate.

Exemplary acrylates having the above formula include methyl, ethyl, n-propyl, isopropyl, n-butyl, secondary butyl, tertiary butyl, hexyl, 2-ethylhexyl, isooctyl, 3,3,5- trimethyhexyl, nonyl, isodecyl, lauryl, octadecyl, cyclohexyl, phenyl, methoxymethyl, methoxyethyl, ethoxymethyl, and ethoxyethyl acrylates.

In general, in a step carried out following preparation of an active polymer sequence, when such sequence is formed from at least one vinylaromatic and/or diene-containing monomer, the latter may be reacted with at least one vinylaromatic, (meth)acrylic, or diene-containing monomer, if required in the presence of a ligand, in order to obtain a trisequenced copolymer. This ligand may be selected, on the one hand, from among the alkali metal or alkaline earth metal salts, e.g., chlorides, fluorides, bromides, iodides, borides, and, on the other, among the alkali metal organic salts, e.g., alcoholates.

Illustrative thereof is, in particular, the anionic polymerization of at least one diene monomer in the presence of a nonpolar solvent, e.g., toluene, benzene, ethylbenzene, and mixtures thereof, as required with a small amount of cyclohexane. After preparing the active polydiene-containing sequence, this sequence may be reacted with at least one vinylaromatic or (meth)acrylate monomer, if necessary in the presence of a ligand such as described in published French Patent Application No. 92/14,318, to produce a trisequenced copolymer.

Also illustrative is the production of trisequenced poly (methyl methacrylate)/vinylaromatic or diene-containing polymer/poly(methyl methacrylate) polymers.

Typically, polymerization of a diene-containing monomer is carried out at a temperature ranging from –80° C. to +100° C., and, preferably, at a temperature ranging from –70° C. to +70° C., and polymerization of a (meth)acrylate monomer is carried out at a temperature ranging from –80° C. to +60° C. and, preferably, at a temperature ranging from –70° C. to 20° C. The polymerization of a vinylaromatic monomer is typically carried out at a temperature ranging from –80° C. to +100° C., and, preferably, at a temperature ranging from –70° C. to +70° C.

The polymerization of a diene-containing monomer is normally carried out over a time period of ½ hour to 24 hours; polymerization of a (meth)acrylate monomer is carried out over a period of time of less than 1 hour, and that of a vinylaromatic monomer, between ½ hour and 24 hours.

The protonic compounds introduced at the end of polymerization to deactivate the active polymer sites may be selected from among water, alcohols, and acids. A preferred such material is acidified methanol.

Subsequently, it is possible to at least partially reduce the residual unsaturation of the polydiene sequences via conventional hydrogenation techniques, to improve various of the properties thereof, in particular stability vis-a-vis ultraviolet light.

The trisequenced (co)polymers and copolymers, such as those prepared using the bifunctional primer according to the invention, are useful for such well known applications as elastomers, thermoplastic elastomers, compatibility-enhancing agents, etc. As thermoformable materials, they may be converted by techniques such as extrusion and injection molding, to provide shaped articles such as fibers, coatings and coverings, shoes, etc. The aforesaid sequenced copolymers, in which the methacrylic monomer is methyl methyacrylate having a high degree of heat-resistance, can be used as pressure-sensitive adhesives and as agents for enhancing the shock- and heat-resistance of polymers, as described in published French Patent Application No. 92/14,318.

In order to further illustrate the present invention and the advantages thereof, the following specific examples are given, it being understood that same are intended only as illustrative and in nowise limitative.

In said examples to follow, all parts and percentages are given by weight, unless otherwise indicated, and the following abbreviations have been employed:

DAN=1,5-diacetylnaphthalene
PhLi=phenyllithium
BPEN=1,5-bis(phenylethenyl)naphthalene,
BPHEN=1,5-bis(1-phenyl-1-hydroxyethyl)naphthalene,
BMEN=1,5-bis(-methylethenyl)naphthalene,
BMHEN=1,5-bis(1-methyl-1-hydroxyethyl)naphthalene,
St=styrene,
BD=butadiene,
sec. BuLi=secondary butyllithium,
THF=tetrahydrofuran,
SBS=trisequenced styrene-butadiene-styrene copolymer

EXAMPLE 1

Preparation of BPEN:

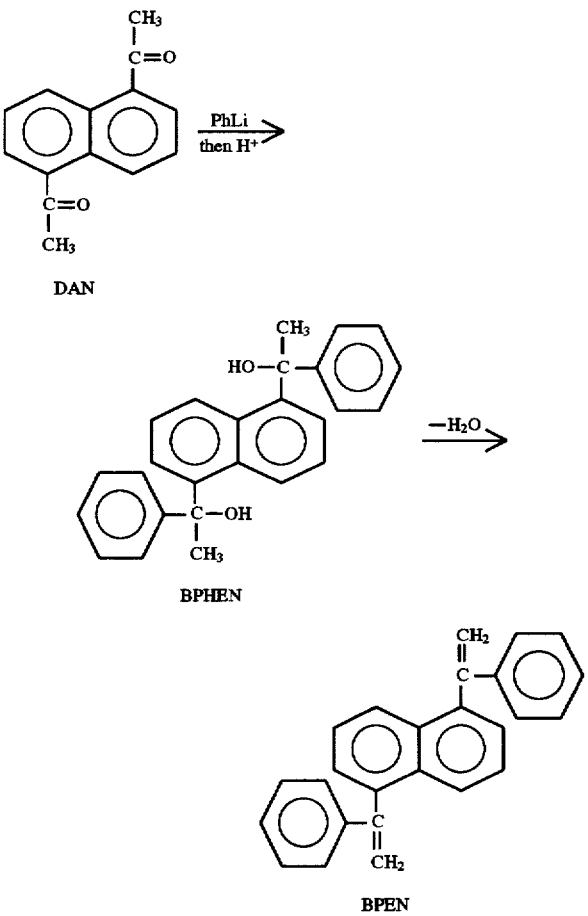

DAN was prepared via the method described by R. Stephen in *Chem. Ber.*, 909 (1957) 296, by reacting acetyl chloride with naphthalene in the presence of aluminum trichloride. The product was crystallized in ethyl alcohol (yield: 35%), and had a melting point of 131.9° C.

In the next step, 5 grams (24 mmoles) DAN were dissolved in 50 ml dried THF and stored in a flask under a nitrogen atmosphere. At the same time, 200 ml THF were cryodistilled in a 500-ml reaction vessel, then 50 mmoles PhLi (2M solution in a benzene/ether mixture) were transferred to the vessel using a syringe. The DAN in solution in the THF was then added to the reaction medium at 5° C. The solution first turned a deep green, then a brick color (heterogeneous reaction). The reaction was carried out for 24 hours, then stopped by adding methanol containing 2.8 ml acetic acid.

The white acetic acid Li salt precipitate was filtered. A clear yellow solution was then separated out, and the solvent evaporated using a rotary evaporator. The remaining product was a mixture of crystalline and oily compounds, which were identified by means of NMR $^1$H and FTIR as being BPHEN, a naphthalene compound containing 1-hydroxyethyl and ethenyl groups, and a small amount of DPEN. The mixture was then dissolved in 70 ml acetic acid heated to reflux temperature. 0.1 ml concentrated $H_2SO_4$ was added using a pipette. The solution was cooled, and then a very pale yellow crystalline product was separated out, washed with cold acetic acid, and dried. The remaining fraction of the product was obtained after evaporating ⅓ of the solvent. A total of 3.1 grams BPEN (39% compared with the DAN) were obtained (melting point: 184° C.).

NMR $^1$H 200 MHz (CDCl$_3$) δ 7.80–7.27 (16H, aromatic) 5.99 (double, 1H, =CH$_2$) 5.40 (double, 1H, =CH$_2$).

EXAMPLE 2

Synthesis of BMEN:

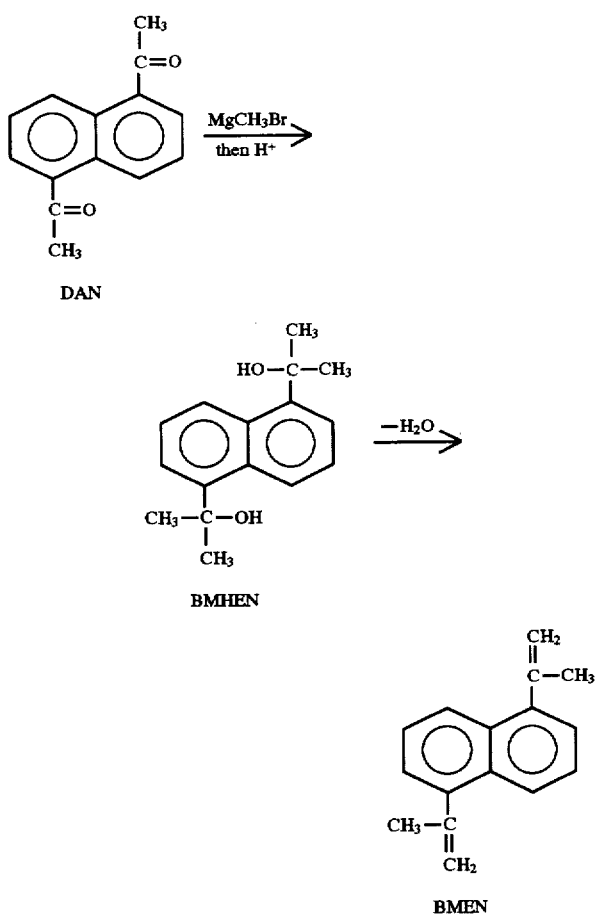

3 grams DAN (14.2 mmoles) were dissolved in 200 ml of a toluene/diethyl ether mixture (1:1, v/v). The reaction vessel was washed with dry nitrogen, and 12 ml methyl magnesium bromide (excess amount, 3M solution in diethyl ether) were dripped in using a syringe. A yellow precipitate formed immediately. The reaction medium was heated to reflux temperature, and the reaction continued for 24 hours.

The product was then poured over 200 grams of a water/ice mixture containing 20 ml HCl; a white precipitate formed. The solids were filtered (conversion rate exceeding 90%) and characterized using NMR $^1$H and FTIR, which indicated BMHEN formation.

6.4 grams BMHEN were dissolved in acetic acid and heated to reflux temperature. 0.1 ml concentrated $H_2SO_4$ was added. The solution was cooled and filtered. A red solid was washed using cold acetic acid. BMHEN yield was 8%.

NMR $^1$H 200 MHz (CDCl$_3$) 7.81–7.26 (6H, aromatic) 5.99 (double, 1H, =CH$_2$) 5.40 (double, 1H, =CH$_2$).

EXAMPLE 3

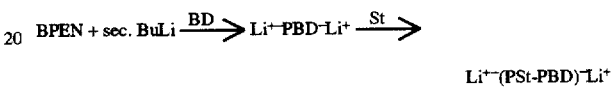

0.1 gram (3×10$^{-4}$ mole) BPEN was placed in a polymerization reaction vessel, preliminarily vacuum-dried for 5 hours. 500 ml purified, dried toluene were added by cryodistillation.

To solubilize the BPEN in toluene, the temperature was increased from −70° C. to 0° C. While conducting the operation in an inert nitrogen and argon atmosphere, several drops of a secondary BuLi solution were added to the reactive mixture until a light green color was maintained. This step was intended to remove residual impurities.

At this temperature of 0° C., 0.45 ml of a 1.4 molar solution of secondary BuLi (i.e., 6.3×10$^{-4}$) was then added to the reaction mixture, which immediately acquired a dark green color. At this stage, neither a precipitate nor a colloidal dispersion was seen to form during a storage period of several hours. This observation evidenced that the primer was soluble in toluene at 0° C.

Next, 28.5 grams (0.53 mole) butadiene were cryodistilled in the reaction vessel at −40° C. After adding the butadiene, the temperature was first increased to 0° C., at which level the appearance of a precipitate was observed, then to +30° C., at which temperature this precipitate solubilized. The reaction then continued for 24 hours at +30° C.

A sample of the polybutadiene formed at this stage was collected and analyzed using NMR and GPC. It had the following properties:

(a) $\overline{M}n$=99,000;

(b) 1,4-structure=91.5%.

The molar mass, which, as calculated, approximated the theoretical molecular weight (theoretical $\overline{M}n$=95,000) confirmed the enhanced solubility and improved regulation of the bifunctional nature of the primer.

10 grams (0.096 mole) preliminarily-purified styrene were added to the reaction medium, which became viscous. The appearance of an orange color, characteristic of polystyryl anions, was observed. The reaction continued for 24 hours at ambient temperature before being stopped using methanol. The SBS copolymer which was recovered by precipitation in methanol, filtration, and drying, was then analyzed by NMR and GPC.

The SBS copolymer had the following properties:

(a) PBD content: 69% by mass, (b) PSt content: 31% by mass,
(c) $\overline{Mn}$=143,000 (value calculated based on $\overline{Mn}$ in the PBD sequence and the composition obtained by NMR),
(d) Polydispersity index: 1.50.

EXAMPLE 4

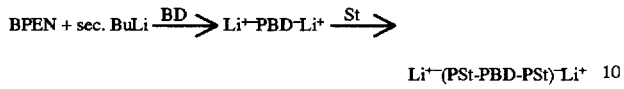

The procedure of Example 3 was repeated, using 0.2 gram BPEN ($6 \times 10^{-4}$ mole) and 0.90 ml ($12.6 \times 10^{-4}$ mole) of secondary BuLi. The proportions of butadiene and styrene were identical to those reported in Example 3.

The polybutadiene PBD sequence obtained under these conditions had an $\overline{Mn}$ value of 47,600 and a 1,4-structural content of 92.9%. The very high correspondence between the calculated and theoretical molecular weight (theoretical $\overline{Mn}$=47,500) confirmed the improved solubility and bifunctional nature of the primer.

The SBS copolymer had the following properties:
(a) Polybutadiene content: 71% by mass,
(b) Polystyrene content: 29% by mass,
(c) $\overline{Mn}$=67,400,
(d) Polydispersity index: 1.40.

EXAMPLE 5

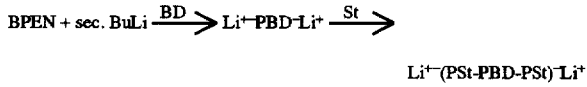

The procedure of Example 3 was repeated, using 0.127 gram ($6.1 \times 10^{-4}$) of BMEN and 0.90 ml ($12.6 \times 10^{-4}$ mole) of secondary BuLi. First, 24.5 grams (0.45 mole) were polymerized as described in Example 3. The polybutadiene sequence obtained under these conditions had an $\overline{Mn}$ value of 41,000, a polydispersity index of 1.20, and a 1,4-structural content of 92%. Polymerization was carried out as indicated in Example 3, by adding 10 grams styrene, or 0.096 mole, to the system.

After polymerization, a sequenced SBS copolymer having a molecular weight of $\overline{Mn}$=59,000 was recovered. The polybutadiene content as determined by proton NMR ($^1$H NMR) was 70% by mass.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process for the anionic polymerization of at least one ethylenically unsaturated monomer in the presence of an alkali metal compound primer therefor, the improvement which comprises, as said primer therefor, a bifunctional primer naphthalene compound having the structural formula (VI):

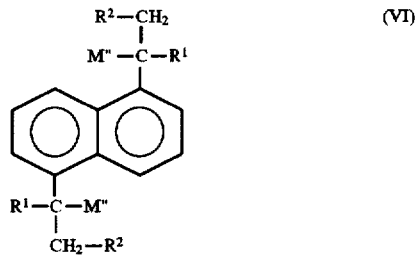

wherein each $R^1$ is a linear, branched or cyclic alkyl radical having from 1 to 12 carbon atoms, or a substituted or unsubstituted aryl radical; each $R^2$ is a $C_1-C_6$ alkyl radical, a $C_5-C_{12}$ cycloalkyl radical, or an aromatic radical; and each M" is an alkali metal.

2. The process as defined by claim 1, said at least one ethylenically unsaturated monomer comprising a diene, vinylaromatic and/or (meth)acrylic monomer.

3. The process as defined by claim 2, carried out in a nonpolar solvent.

4. The process as defined by claim 2, comprising the preparation of a trisequenced block copolymer.

5. The process as defined by claim 2, comprising the polymerization of butadiene, isoprene, styrene, methyl methacrylate, or mixture thereof.

* * * * *